US011268200B2

(12) United States Patent
Oener et al.

(10) Patent No.: US 11,268,200 B2
(45) Date of Patent: Mar. 8, 2022

(54) BIPOLAR MEMBRANES

(71) Applicant: University of Oregon, Eugene, OR (US)

(72) Inventors: Sebastian Oener, Eugene, OR (US); Shannon W. Boettcher, Eugene, OR (US); Marc Foster, Eugene, OR (US)

(73) Assignee: University of Oregon, Eugene, OR (US)

( * ) Notice: Subject to any disclaimer, the term of this patent is extended or adjusted under 35 U.S.C. 154(b) by 182 days.

(21) Appl. No.: 16/817,502

(22) Filed: Mar. 12, 2020

(65) Prior Publication Data

US 2020/0370188 A1    Nov. 26, 2020

Related U.S. Application Data

(60) Provisional application No. 62/850,475, filed on May 20, 2019, provisional application No. 62/984,652, filed on Mar. 3, 2020.

(51) Int. Cl.
| | | |
|---|---|---|
| *C25B 1/04* | (2021.01) | |
| *C25B 9/23* | (2021.01) | |
| *C25B 13/08* | (2006.01) | |
| *B01J 23/46* | (2006.01) | |
| *B01J 23/755* | (2006.01) | |

(Continued)

(52) U.S. Cl.
CPC ............. *C25B 13/04* (2013.01); *B01J 23/468* (2013.01); *B01J 23/755* (2013.01); *C25B 1/04* (2013.01); *C25B 9/23* (2021.01); *C25B 9/73* (2021.01); *C25B 13/08* (2013.01); *B01D 61/445* (2013.01); *B01D 69/145* (2013.01)

(58) Field of Classification Search
CPC ...... C25B 9/23; B01D 69/145; B01D 61/1445
See application file for complete search history.

(56) References Cited

U.S. PATENT DOCUMENTS

| | | | |
|---|---|---|---|
| 2003/0006138 A1 | 1/2003 | Nago et al. | |
| 2006/0173084 A1* | 8/2006 | Zheng | B01D 61/445 |
| | | | 521/27 |

(Continued)

FOREIGN PATENT DOCUMENTS

| | | |
|---|---|---|
| CN | 101949032 B | 8/2013 |
| CN | 107737614 A | 2/2018 |

(Continued)

OTHER PUBLICATIONS

Oener et al, Accelerating water dissociation in bipolar membranes and for electrocatalysis, Science, vol. 369, No. 6507, Aug. 2020, pp. 1099-1103 (Year: 2020).*

(Continued)

*Primary Examiner* — Harry D Wilkins, III
(74) *Attorney, Agent, or Firm* — Klarquist Sparkman, LLP

(57) ABSTRACT

A bipolar membrane comprising a first member comprising at least one anion exchange material; a second member comprising at least one cation exchange material, wherein the first member and the second member together form an interface junction; and disposed within the interface junction a first layer comprising a first water dissociation catalyst and a second layer comprising a second water dissociation catalyst, wherein the first water dissociation catalyst is different than the second water dissociation catalyst.

20 Claims, 11 Drawing Sheets

(51) Int. Cl.
*C25B 13/04* (2021.01)
*C25B 9/73* (2021.01)
*B01D 69/14* (2006.01)
*B01D 61/44* (2006.01)

(56) References Cited

U.S. PATENT DOCUMENTS

2019/0127865 A1  5/2019  Li et al.
2019/0134570 A1  5/2019  Pintauro et al.

FOREIGN PATENT DOCUMENTS

| JP | 2020-079648 A | * | 6/2020 | ............. B01D 61/46 |
| KR | 2016-0060543 A | * | 5/2016 | ............. B01J 47/12 |
| WO | WO 94/19399 A1 | * | 9/1994 | ................ C08J 5/22 |
| WO | WO2017205458 | | 11/2017 | |

OTHER PUBLICATIONS

Zhou et al, Preparation and characterization of bipolar membranes modified by photocatalyst nano-ZnO and nano-CeO2, Applied Surface Science, vol. 258, No. 8, Feb. 2012, pp. 4023-4027 (Year: 2012).*

Balster et al, Tailoring the interface layer of the bipolar membrane, Journal of Membrane Science, vol. 365, No. 1-2, Dec. 2010, pp. 389-398 (Year: 2010).*

Kang et al, Effects of inorganic substances on water splitting in ion-exchange membranes: I. Electrochemical characteristics of ion-exchange membranes coated with iron hydroxide/oxide and silica sol, Journal of Colloid and Interface Science, vol. 273, No. 2, May 2004, pp. 523-532 (Year: 2004).*

Mayerhofer et al, Bipolar Membrane Electrode Assemblies for Water Electrolysis, ACS Applied Energy Materials, vol. 3, No. 10, Jul. 2020, pp. 9635-9644 (Year: 2020).*

Yan et al, The balance of electric field and interfacial catalysis in promoting water dissociation in bipolar membranes, Energy & Environmental Science, vol. 11, No. 8, Jun. 2018, pp. 2235-2245 (Year: 2018).*

Abdu et al., "Catalytic Polyelectrolyte Multilayers at the Bipolar Membrane Interface," *ACS Applied Materials & Interfaces*, 5(1): 10445-10455, Oct. 1, 2013.

McDonald et al., "Use of Bipolar Membranes for Maintaining Steady-State pH Gradients in Membrane—Supported, Solar Drive Water Splitting," *ChemSusChem*, 7 (11): 3021-3027, Sep. 22, 2014.

* cited by examiner

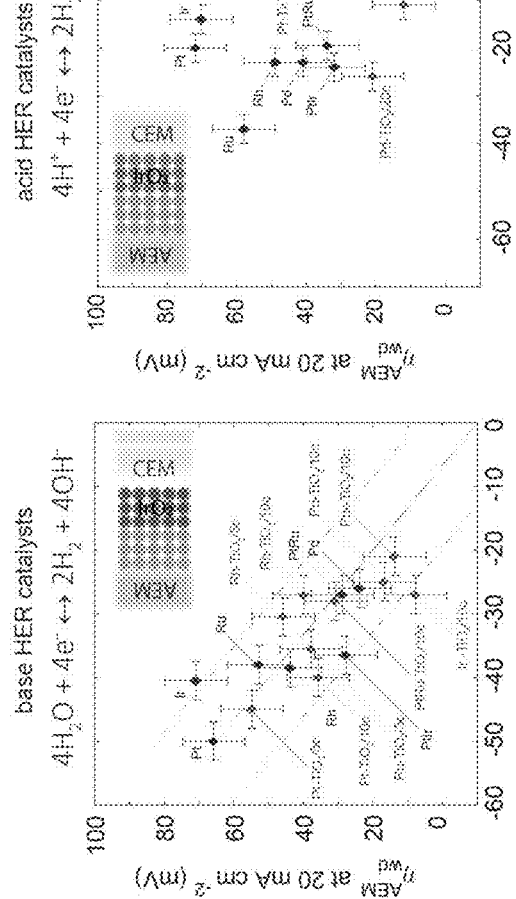
FIG. 8A
FIG. 8B
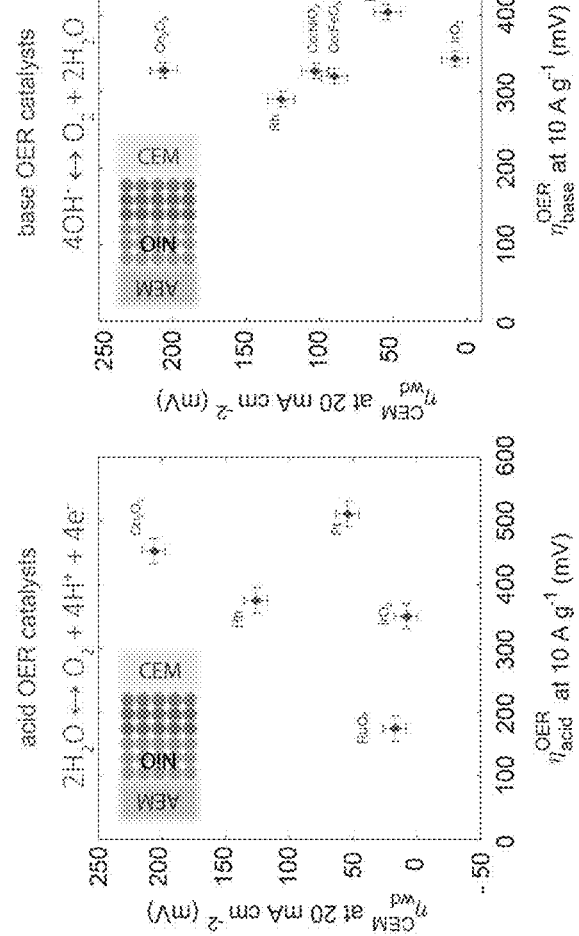
FIG. 8C
FIG. 8D

BIPOLAR MEMBRANES

CROSS REFERENCE TO RELATED APPLICATION

This application claims the benefit of the earlier filing date of U.S. Provisional Patent Application No. 62/850,475, filed on May 20, 2019, and U.S. Provisional Patent Application No. 62/984,652, filed on Mar. 3, 2020, the entirety of which are incorporated herein by reference.

ACKNOWLEDGMENT OF GOVERNMENT SUPPORT

This invention was made with government support under grant number CHE-1566348 awarded by the National Science Foundation. The government has certain rights in the invention.

BACKGROUND

Catalyzing heterolytic water dissociation (WD), $H_2O \rightarrow H^+ + OH^-$, is practically important for accelerating electrocatalytic reactions that consume water and for fabricating bipolar-membrane (BPM) devices that couple different pH environments into a single electrochemical process. Slow water dissociation kinetics have led to bipolar membranes with poor electrochemical performance unsuitable for energy conversion technologies such as water electrolyzers.

SUMMARY

Disclosed herein is a bipolar membrane comprising a first member comprising at least one anion exchange material; a second member comprising at least one cation exchange material, wherein the first member and the second member together form an interface junction; and disposed within the interface junction a first layer comprising a first water dissociation catalyst and a second layer comprising a second water dissociation catalyst, wherein the first water dissociation catalyst is different than the second water dissociation catalyst.

Also disclosed herein is a bipolar membrane comprising a first member comprising at least one anion exchange material having a first surface; a second member comprising at least one cation exchange material having a second surface, wherein the first member first surface and the second member second surface face each other to form an interface junction; and disposed within the interface junction is a plurality of individual layers, each individual layer comprising a different water dissociation catalyst wherein each individual layer of water dissociation catalyst functions within a predetermined pH range interval within a pH gradient extending between the first material first surface and the second material second surface.

The foregoing will become more apparent from the following detailed description, which proceeds with reference to the accompanying figures.

BRIEF DESCRIPTION OF THE DRAWINGS

FIGS. 8A-8D. Comparison between WD and electrocatalytic overpotentials measured on the same nanoparticles. (FIG. 8A) The overpotentials for WD in a locally basic environment (with IrO$_2$ used as the stable WD catalyst on the acidic CEM surface) correlate with the overpotentials measured for HER in 1.0 M KOH, consistent with WD being rate-limiting in alkaline HER. (FIG. 8B) No correlation is found between the overpotentials for WD and the HER performance in 1.0 M H$_2$SO$_4$, consistent with WD not being involved in the acidic HER mechanism. Dark markers in (FIG. 8A) and (FIG. 8B) show the as-received nanoparticles and light markers the ones after TiO$_2$-ALD decoration. (FIG. 8C) The overpotentials for WD in a locally acidic environment (with NiO used as the stable WD catalyst on the basic AEM surface) do not strongly correlate with the overpotentials measured for OER in 1.0 M H$_2$SO$_4$, consistent with WD not being rate-limiting. (FIG. 8D) No correlation is present between WD and OER overpotentials in 1.0 M KOH, consistent with the large OH$^-$ concentration obviating the need for WD. The loading for the electrocatalysis studies was 0.1-1 mg cm$^{-2}$, and the current densities were 1-10 mA cm$^{-2}$, similar to the WD current densities studied in the BPM.

Figure 10:
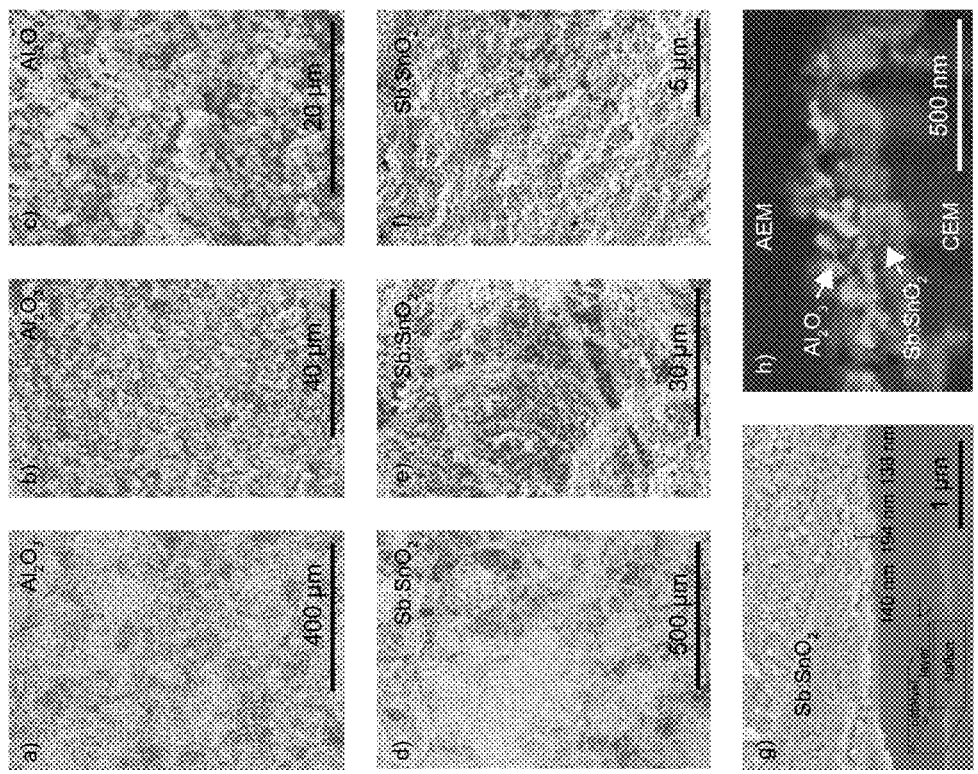

These results, together with the scanning electron microscopy images in FIG. 10, indicate catalytic WD that is confined to a region near the membrane surface at 20 mA cm$^{-2}$. At higher junction thickness a contribution from series resistance through the WD catalyst layer (that is likely to have a high ionic resistance) is likely.

FIG. 10. Scanning electron microscopy images of $Al_2O_3$, $SnO_2$ and Pd catalyst layers on Nafion® at a nominal layer thickness of 200 nm. The nanoparticle layers cover most of the Nafion® surface, while some smaller uncovered Nafion® patches are visible. With decreasing nominal thicknesses (<200 nm) we observe decreasing coverage. Critically, we also observe a clear effect of the location of the catalyst layers studied (i.e. next to the basic AEM or acidic CEM surface) on $\eta_{wd}$. Thus, the first spray-coated nanoparticle film with a thickness of ~200 nm (shown in the SEM images here) is able to block most of the Nafion® surface from the next catalyst layer which will be in contact with the AEM after the BPM MEA preparation. Most of the catalytic activity appears to stem from the regions close to the AEM and CEM surface.

Figure 11:
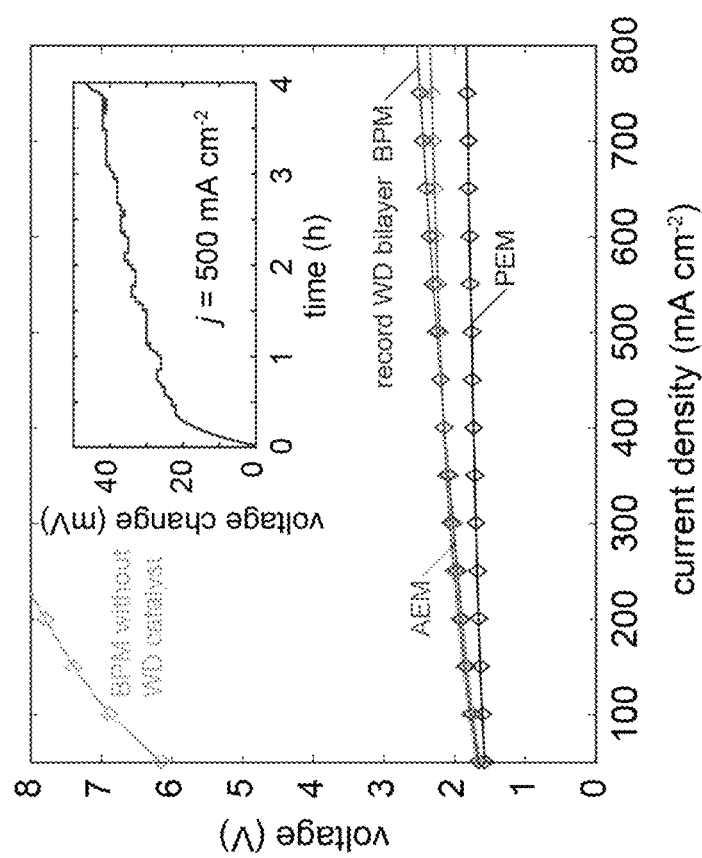

FIG. 11. Alkaline, acidic, and bipolar membrane electrolyzers. BPM electrolyzers require >6 V to drive electrolysis at 50 mA cm$^{-2}$ without additional WD catalysts. When the bilayer WD catalysts disclosed herein are added, the performance dramatically improves and is similar to a reference AEM electrolyzer. The PEM electrolyzer performs better due to the superior properties of Nafion® compared to Sustainion®. For all electrolyzers, the cathode and anode catalyst composition and loading was identical. The AEM and bilayer BPM electrolyzer polarization curves are averages over three devices/datasets with the error indicated by the thickness of the line. The inset shows that the BPM electrolyzer performance is relatively stable over 4 h of operation at 500 mA cm$^{-2}$.

DETAILED DESCRIPTION

Terminology

As used herein, the term "ionomer" generally refers to a polymer or other material that conducts ions. More precisely, the ionomer refers to a material that includes repeat units of at least a fraction of ionized units. As used herein, the term "polyelectrolyte" generally refers to a type of ionomer, and particularly a material whose repeating units bear an electrolyte group, which will dissociate when the polymer is exposed to aqueous solutions (such as water), making the polymer charged. The ionomers and polyelectrolytes may be generally referred to as "charged polymers" or "charged materials". As used herein, polyelectrolyte, ionomer, and charged polymer can be used interchangeably.

"Nanoparticle", as used herein, unless otherwise specified, generally refers to a particle of a relatively small size, but not necessarily in the nanometer size range. In certain embodiments, nanoparticles specifically refers to particles having a diameter from 1 nm to 1 micron, or 1 to 1000 nm, preferably from 3 to 100 nm. As used herein, the nanoparticle encompasses nanospheres, nanocapsules, nanoparticles, or nanorods, unless specified otherwise. A nanoparticle may be of composite construction and is not necessarily a pure substance; it may be spherical or any other shape.

Overview

Water is arguably the most-important molecule to humanity due to its ubiquitous role in biological, industrial, and environmental processes. Heterolytic water dissociation (WD), $H_2O \rightarrow H^+ + OH^-$, is the simplest reaction involving water and a critical elementary step in many chemical and (electro)catalytic processes. Improving the activity of WD catalysts and developing a basic understanding of their function, particularly under conditions relevant to aqueous electrocatalytic applications, is of both fundamental and practical importance.

One electrochemical system that can be used to drive WD is the bipolar membrane (BPM). A BPM is an ion exchange membrane having a first member comprising at least one anion exchange material adjacent to a second member comprising at least one cation exchange material to form a junction. The anion exchange material may be in the form of an organic or inorganic anion exchange membrane or layer. The cation exchange member may be in the form of an organic or inorganic cation exchange membrane or layer. As used herein, the term "AEM" denotes an anion-exchange membrane generally made of ionomers and designed to conduct anions, and the term "CEM" denotes a cation exchange membrane generally made of ionomers and designed to conduct cations. A CEM has fixed anionic groups and mobile cations. An AEM has fixed cationic groups and mobile anions.

When sufficient electrochemical bias of the appropriate sign is applied across a hydrated BPM, water in the BPM junction is dissociated. The generated $H^+$ and $OH^-$ are separated with the $H^+$ driven through the CEM with $[H^+]$ ~1 M and the $OH^-$ through the AEM with $[OH^-]$ ~1 M. The high ionic conductivities of the AEM and the CEM ensure that only a comparatively small part of the applied electrochemical potential difference (free energy input) is needed for ionic transport in the membranes. Traditionally, most of the free energy input is consumed in dissociating water inside the junction. To lower the wasted free energy for WD, i.e. the WD overpotential ($\eta_{wd}$), WD catalysts are needed inside the junction.

At electrochemical equilibrium (no current flow) an electrostatic potential develops across the BPM that compensates the chemical potential difference between the AEM and CEM, i.e. the different $H^+$ activities between the AEM and CEM. Two pH-independent reference electrodes (e.g. Ag/AgCl) are used to measure this electrostatic potential difference, which is ideally 0.83 V at 25° C. when the membranes are ~1 M in $OH^-$ and $H^+$. When current is passed through the system (for example by driving faradaic reactions on two electrodes separate from the reference electrodes, e.g. see BPM electrolyzer), the electrostatic potential across the bipolar membrane changes, because a driving force is needed to dissociate water and separate the incipient $H^+$ and $OH^-$ at the AEM/CEM junction. This measured electrostatic potential change is the water dissociation overpotential ($\eta_{wd}$) required to drive the WD reaction maintaining the constant $[H^+]$ and $[OH^-]$ within the CEM and AEM, respectively, at steady state.

Commercial and research BPMs show slow WD kinetics with substantial WD overpotentials (>100 mV) even at moderate current densities of ~20 mA cm$^{-2}$ (see Table 2 below). Because of the large WD overpotentials, BPMs cannot yet be used in applications where low overpotentials at high current densities of 0.5-2 A cm$^{-2}$ are required, such as water electrolysis ($2H_2O \rightarrow 2H_2 + O_2$), $CO_2$ electrolyzers where BPMs prevent dissolved (bi)carbonate crossover, or (regenerative) fuel cells where BPMs facilitate the use of earth-abundant electrocatalysts.

Disclosed herein is a BPM that includes at least two different WD catalysts (e.g., including, but not limited to inorganic materials such as, metals, metal oxides, metal phosphides, and metal sulfides) disposed within the BPM interface junction between the AEM and CEM. In certain embodiments, the AEM and the CEM are not in physical contact with each other due to the presence of the WD catalysts.

In certain embodiments, at least one of the WD catalysts comprises nanoparticles. In certain embodiments, the WD catalyst nanoparticles have specific surface areas ranging from 1-3000 m$^2$/g, typically 10-100 m$^2$/g.

Figure 1:
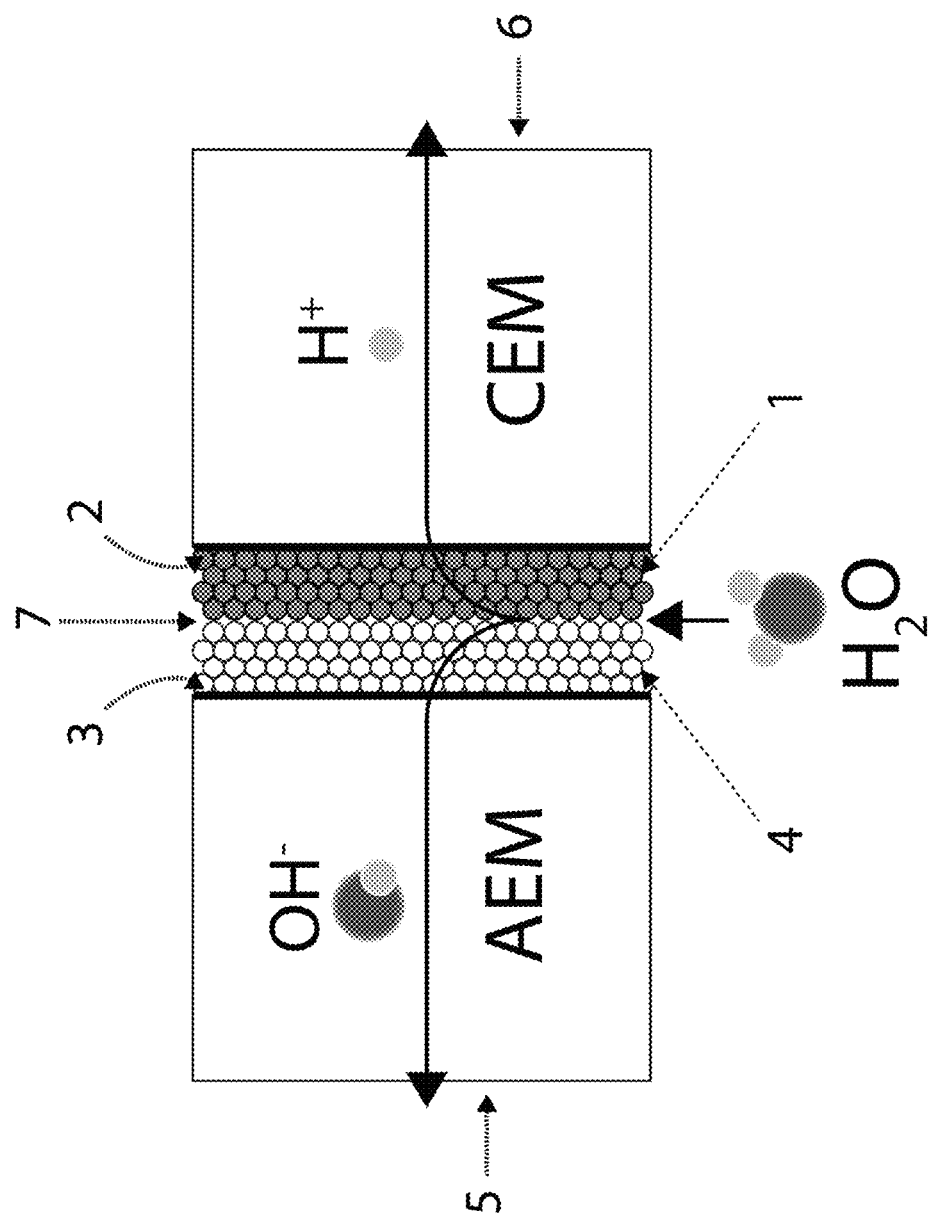
FIG. 1 is a schematic representation of a bipolar membrane having two different WD catalyst nanoparticles phases disposed between an anion conducting phase, such as an anion-exchange membrane (AEM) and a cation conducting phase, such as a cation-exchange membrane (CEM) as disclosed herein.
Figure 2:
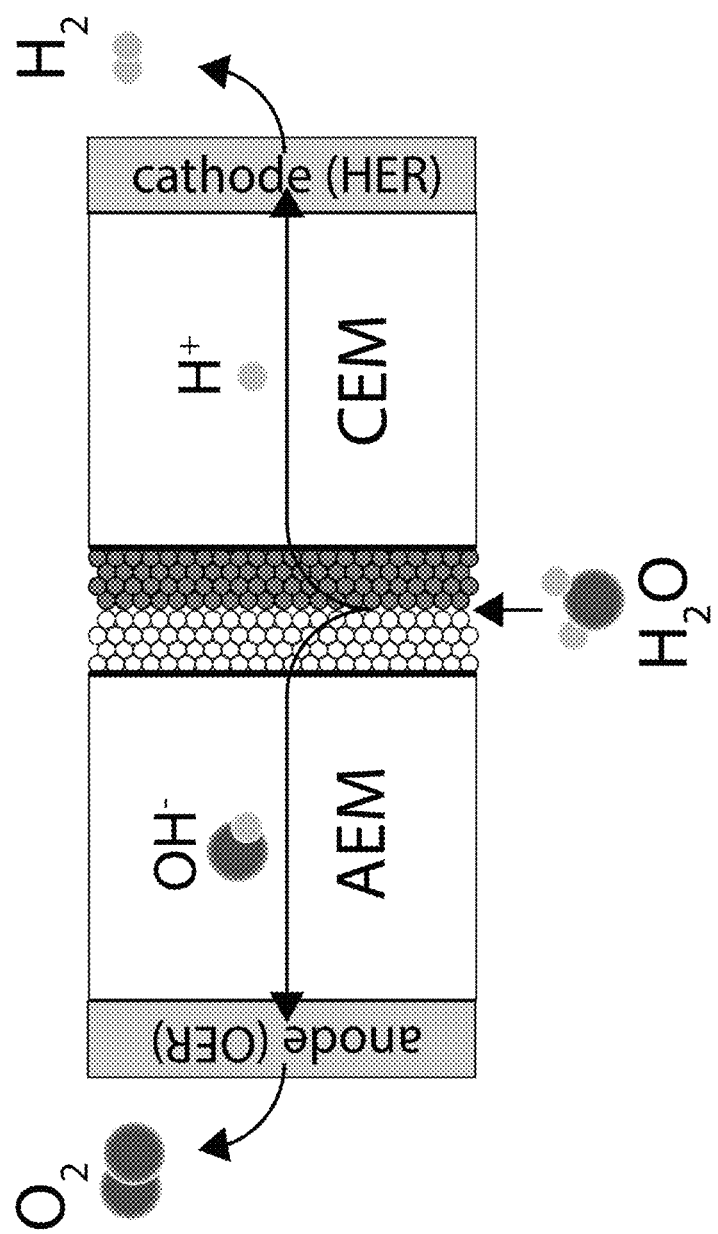
FIG. 2 is a schematic representation of a membrane-electrode assembly (MEA). The MEA is comprised of anode and cathode gas diffusion layers (GDLs) with an oxygen-evolution-reaction (OER) catalyst and a hydrogen-evolution reaction (HER) catalyst (other anode and cathode catalysts can be used), the AEM and CEM, and the WD catalyst. The MEA is kept under constant mechanical pressure preventing delamination of the GDLs, the AEM and the CEM.

FIG. 1 is a schematic representation of a BPM having two different WD catalyst nanoparticles disposed between an anion-exchange member (AEM) 5 and a cation-exchange member (CEM) 6. A first layer 1 of first WD catalyst nanoparticles is disposed on a CEM surface 2 that faces an AEM surface 3. A second layer 4 of second WD catalyst nanoparticles is disposed on the AEM surface 3. At least a portion of the first layer 1 of the first WD catalyst nanoparticles contacts at least a portion of the second layer 4 of second WD catalyst nanoparticles. The WD catalyst nanoparticles are disposed within an interface junction 7 formed between the CEM surface 2 and the AEM surface 3. Different nanoparticle WD catalysts can be placed on the acidic CEM and basic AEM surfaces. In certain embodiments at least a portion of the WD catalyst nanoparticles contact the respective CEM and AEM surfaces 2,3. In certain embodiments, only a portion of the WD catalyst nanoparticles contact the respective CEM and AEM surfaces 2,3.

The BPM interface junction 7 may be planar as shown in FIG. 1. Alternatively, the BPM interface junction may be a three-dimensional junction as described, for example, in US 2019/0134570A1 and WO 2017/205458A1.

Using multiple layers of different WD catalysts can achieve water dissociation overpotentials that are almost zero. For example, a NiO nanoparticle layer on a planar AEM surface and a TiO$_2$ nanoparticle layer on a planar CEM surface lead to a WD overpotential of approximately 32±9 mV at 20 mA cm$^{-2}$. A NiO nanoparticle layer on a planar AEM surface and an IrO$_2$ nanoparticle layer on a planar CEM surface lead to a WD overpotential of approximately 8±9 mV at 20 mA cm$^{-2}$. Increasing the surface area of at least one of the adjacent anion or cation conducting phases, or decreasing the nanoparticle sizes and thus increasing the catalytically active surface area will reduce the overpotential further.

The WD catalyst materials may be any inorganic, organic, or inorganic-organic hybrid material (i.e. including but not limited to metals, metal oxides, metal phosphides, metal sulfides, etc.). Illustrative metals and metal oxides include rutile and anatase TiO$_2$, In$_2$O$_3$, indium tin oxide (ITO), Sb:SnO$_2$ (ATO), Sn$_2$O$_3$, Ir, IrO$_2$, Pt, Ru, RuO$_2$, Pd, Rh, MnO$_2$, NiO, Al$_2$O$_3$, SiO$_2$, ZnO$_2$, ZrO$_2$, Co$_2$O$_3$, (and variations thereof, e.g., Co:Fe$_2$O$_3$, Fe(OH)$_3$, Pt—Ir(1:1), and Pt—Ru(1:1). On the AEM surface, the following nanoparticles dissociate water particularly well: Pd, PtRu, PtIr, Ir, Rh, NiO, MnO$_2$, Al$_2$O$_3$, SiO$_2$, anatase and rutile TiO$_2$, Co$_2$O$_3$. On the CEM surface, the following nanoparticles dissociate water particularly well: RuO$_2$, IrO$_2$, anatase and rutile TiO$_2$, Fe(OH)$_3$, MnO$_2$, Pt, SiO$_2$, ATO, SnO$_2$, Co$_2$O$_3$, ZrO$_2$, In$_2$O$_3$, Rh. In certain embodiments, the catalyst on the AEM is selected from NiO, Pd, PtIr or Ir and the catalyst on the CEM surface is selected from Fe(OH)$_3$, RuO$_2$, or IrO$_2$.

Illustrative forms and/or morphologies for the inorganic materials include nanoparticles, TiO$_2$-coated nanoparticles, core-shell nanoparticles, (e.g., Ir on ATO that have only a very thin layer of Ir on the surface, layered materials such as metal hydroxides and sulfides.) The inorganic materials may be disposed on the AEM or CEM surface as continuous layer or as non-continuous layer. If the metal and/or metal oxides are nanoparticles, a layer of nanoparticles may be disposed on the surface wherein the layer includes interstitial spaces between the nanoparticles.

The thickness of each individual layer of WD catalysts may vary. In certain embodiments, an individual layer of WD catalysts may be 1 nm to 0.5 μm, more particularly 10 to 200 nm. The total thickness of all of the WD catalyst layers may vary. In certain embodiments, the total thickness may be 0.02 to 1 μm, more particularly 0.02 to 0.5 μm.

In certain embodiments, there may be more than two layers of distinct WD catalysts. For example, there may be 3, 4, 5, 6, or more individual layers of distinct WD catalysts. In certain embodiments, each individual layer of WD catalyst is designed to function within a predetermined pH range that coincides with a pH gradient extending between the AEM surface and the CEM surface. For example, there may be a different WD catalyst layer at each 1 pH interval, or at each 2 pH interval, or at each 3 pH interval.

In certain embodiments, the WD catalyst may be mixed ion conducting materials to increase performance of the system Several embodiments of two different WD catalysts that were tested in BPMs are shown below in Table 1.

| $\eta_{wd}$ (mV) est. at 20 mA cm$^{-2}$ | T (° C.) | Electrolyte(s) | WD catalyst, (AEM\|CEM) | # layers, geometry | CEM | AEM |
|---|---|---|---|---|---|---|
| 381 ± 9 | 50 | di-H$_2$O | NiO (AEM)\| Al$_2$O$_3$ (CEM) | 2, 2D | Nafion | Sustainion |
| 213 ± 9 | 50 | di-H$_2$O | Sb:SnO$_2$(AEM)\| Sb:SnO$_2$ (CEM) | 2, 2D | Nafion | Sustainion |
| 206 ± 9 | 50 | di-H$_2$O | NiO (AEM)\| Co$_2$O$_3$ HT (CEM) | 2, 2D | Nafion | Sustainion |
| 189 ± 9 | 50 | di-H$_2$O | Sn:In$_2$O$_3$ (AEM)\| Sb:SnO$_2$ (CEM) | 2, 2D | Nafion | Sustainion |
| 181 ± 9 | 50 | di-H$_2$O | Fe(OH)$_3$ (AEM)\| Sb:SnO$_2$ (CEM) | 2, 2D | Nafion | Sustainion |
| 171 ± 9 | 50 | di-H$_2$O | NiO (AEM)\| ZrO$_2$ (CEM) | 2, 2D | Nafion | Sustainion |
| 160 ± 9 | 50 | di-H$_2$O | In$_2$O$_3$ (AEM)\| Sb:SnO$_2$ (CEM) | 2, 2D | Nafion | Sustainion |
| 130 ± 9 | 50 | di-H$_2$O | NiO (AEM)\| In$_2$O$_3$ (CEM) | 2, 2D | Nafion | Sustainion |
| 126 ± 9 | 50 | di-H$_2$O | NiO (AEM)\|Rh (CEM) | 2, 2D | Nafion | Sustainion |
| 115 ± 9 | 50 | di-H$_2$O | Co$_2$O$_3$ (AEM)\| Sb:SnO$_2$ (CEM) | 2, 2D | Nafion | Sustainion |
| 101 ± 9 | 50 | di-H$_2$O | Al$_2$O$_3$ (AEM)\| Sb:SnO$_2$ (CEM) | 2, 2D | Nafion | Sustainion |
| 86 ± 9 | 50 | di-H$_2$O | TiO$_2$ anat. (AEM)\| Sb:SnO$_2$ (CEM) | 2, 2D | Nafion | Sustainion |
| 82 ± 9 | 50 | di-H$_2$O | MnO$_2$ (AEM)\| Sb:SnO$_2$ (CEM) | 2, 2D | Nafion | Sustainion |
| 74 ± 9 | 50 | di-H$_2$O | NiO (AEM)\| SiO$_2$ (CEM) | 2, 2D | Nafion | Sustainion |
| 71 ± 9 | 50 | di-H$_2$O | Ir (AEM)\|IrO$_2$ (CEM) | 2, 2D | Nafion | Sustainion |
| 69 ± 9 | 50 | di-H$_2$O | SiO$_2$ (AEM)\| Sb:SnO$_2$ (CEM) | 2, 2D | Nafion | Sustainion |
| 66 ± 9 | 50 | di-H$_2$O | Pt (AEM)\|IrO$_2$ (CEM) | 2, 2D | Nafion | Sustainion |
| 65 ± 9 | 50 | di-H$_2$O | NiO (AEM)\| TiO$_2$ rutile (CEM) | 2, 2D | Nafion | Sustainion |
| 60 ± 9 | 25 | KOH\|H$_2$SO$_4$ | IrO$_2$ | 1, 2D | Nafion | Sustainion |

| $\eta_{wd}$ (mV) est. at 20 mA cm$^{-2}$ | T (° C.) | Electrolyte(s) | WD catalyst, (AEM\|CEM) | # layers, geometry | CEM | AEM |
|---|---|---|---|---|---|---|
| 57 ± 9 | 50 | di-H$_2$O | NiO (AEM)\| Sb:SnO$_2$ (CEM) | 2, 2D | Nafion | Sustainion |
| 55 ± 9 | 50 | di-H$_2$O | Pt/5c (AEM)\|IrO$_2$ $_0$(CEM) | 2, 2D | Nafion | Sustainion |
| 54 ± 9 | 50 | di-H$_2$O | NiO (AEM)\|Pt (CEM) | 2, 2D | Nafion | Sustainion |
| 53 ± 9 | 50 | di-H$_2$O | Ru (AEM)\|IrO$_2$ (CEM) | 2, 2D | Nafion | Sustainion |
| 47 ± 9 | 50 | di-H$_2$O | NiO (AEM)\| MnO$_2$ (CEM) | 2, 2D | Nafion | Sustainion |
| 44 ± 9 | 50 | di-H$_2$O | Rh (AEM)\|IrO$_2$ (CEM) | 2, 2D | Nafion | Sustainion |
| 44 ± 9 | 50 | KOH\|H$_2$SO$_4$/ di-H$_2$O | IrO$_2$ | 1, 2D | Nafion | Sustainion |
| 40 ± 9 | 50 | di-H$_2$O | Rh/10c (AEM)\|IrO$_2$ (CEM) | 2, 2D | Nafion | Sustainion |
| 38 ± 9 | 50 | di-H$_2$O | Ru/5c (AEM)\|IrO$_2$ (CEM) | 2, 2D | Nafion | Sustainion |
| 36 ± 9 | 50 | di-H$_2$O | Pt/10c (AEM)\|IrO$_2$ (CEM) | 2, 2D | Nafion | Sustainion |
| 32 ± 9 | 50 | di-H$_2$O | NiO (AEM)\|TiO$_2$ (CEM) | 2, 2D | Nafion | Sustainion |
| 31 ± 9 | 50 | di-H$_2$O | PtRu/10c (AEM)\|IrO$_2$ (CEM) | 2, 2D | Nafion | Sustainion |
| 29 ± 9 | 50 | di-H$_2$O | PtRu (AEM)\|IrO$_2$ (CEM) | 2, 2D | Nafion | Sustainion |
| 29 ± 9 | 50 | di-H$_2$O | NiO (AEM)\|SnO$_2$ (CEM) | 2, 2D | Nafion | Sustainion |
| 28 ± 9 | 50 | di-H$_2$O | PtIr (AEM)\|IrO$_2$ (CEM) | 2, 2D | Nafion | Sustainion |
| 24 ± 9 | 50 | di-H$_2$O | Pd (AEM)\|IrO$_2$ (CEM) | 2, 2D | Nafion | Sustainion |
| 23 ± 9 | 50 | di-H$_2$O | NiO (AEM)\|Fe(OH)$_3$ (CEM) | 2, 2D | Nafion | Sustainion |
| 17 ± 9 | 50 | di-H$_2$O | NiO (AEM)\|RuO$_2$ (CEM) | 2, 2D | Nafion | Sustainion |
| 17 ± 9 | 50 | di-H$_2$O | Pd/20c (AEM)\|IrO$_2$ (CEM) | 2, 2D | Nafion | Sustainion |
| 14 ± 9 | 50 | di-H$_2$O | PtIr/10C (AEM)\|IrO$_2$ (CEM) | 2, 2D | Nafion | Sustainion |
| 8 ± 9 | 50 | di-H$_2$O | NiO (AEM)\|IrO$_2$ (CEM) | 2, 2D | Nafion | Sustainion |
| 8 ± 9 | 50 | di-H$_2$O | Ir/10C (AEM)\|IrO$_2$ (CEM) | 2, 2D | Nafion | Sustainion |

The best performing BPMs are those that utilize two chemically distinct layers of nanoparticle catalysts between the basic AEM and acidic CEM, where each individual layer performs optimally at the respective local pH. For the basic AEM surface, in particular, noble metals (Pt, Ir, Ru, PtRu, PtIr) and modifications thereof (here via atomic layer deposition), that also tend to be highly active electrocatalysts for the hydrogen evolution reaction in base, lead to high WD activity. Additionally, many conductive and non-conductive metal oxides that are excellent WD catalysts on the basic AEM surface, such as NiO, MnO$_2$ and TiO$_2$, tend to have point of zero charge values in the basic pH range. On the acidic CEM surface, in particular, metal oxides (IrO$_2$, RuO$_2$), that are also highly active electrocatalysts for the oxygen evolution reaction in acid, lead to high WD activity. Additionally, many conductive and non-conductive metal oxides that are excellent WD catalysts on the acidic CEM surface, such as Sb:SnO$_2$, SnO$_2$ and TiO$_2$, and Fe(OH)$_3$ tend to have point of zero charge values in the acidic pH range.

In certain embodiments, the WD catalyst nanoparticles may be spray coated onto the desired surface (e.g., the AEM or CEM surface). In one embodiment, a surface of a CEM or AEM is spray coated with a first type of WD catalyst nanoparticles thereby forming a first layer of WD catalyst nanoparticles. A second type of WD catalyst nanoparticles is then spray coated onto the first type of WD catalyst nanoparticles thereby forming a second layer that contacts the first layer. The other associated membrane (AEM or CEM) is then placed onto the second layer. In another embodiment, a surface of a CEM is spray coated with a first type of WD catalyst nanoparticles thereby forming a first layer of WD catalyst nanoparticles. A surface of an AEM is then spray coated with a second type of WD catalyst nanoparticles forming another layer of WD catalyst nanoparticles. The respective coated membranes are then contacted together so that the first and second nanoparticles contact each other.

In certain embodiments, the WD catalyst nanoparticles may be included in a bilayer nanoparticle film that includes a polymer to bind the nanoparticles, and/or optimize ionic conduction and water transport. This bilayer nanoparticle film can be interposed between the AEM and CEM and the resulting subassembly compressed at an elevated temperature to link the polymer, nanoparticles, AEM and CEM.

In certain embodiments, the one or more cation exchange materials of the CEM include at least one of polymers containing protogenic groups including sulfonic, sulfonimide, phosphonic and carboxylic, and their derivatives. For example, the one or more cation exchange polymers include at least one of poly(arylene ether sulfonic acid), poly(phenylsulfone sulfonic acid), poly(phenylene oxide sulfonic acid), poly(arylene sulfonic acid), poly(phosphazene sulfonic acid), sulfonated polybenzimidazole, perfluorosulfonic acid polymers, poly(vinylphosphonic acid), poly(acrylic acid), poly(methacrylic acid) and their copolymers, carboxyphenoxymethylpolysulfone, and their derivatives.

In one embodiment, the perfluorosulfonic acid polymers comprises Nafion®, Aquivion®, or their derivatives. In one embodiment, the one or more cation exchange polymers include sulfonated poly(ether ether ketone) (SPEEK).

In certain embodiments, the one or more anion exchange polymers of the AEM include at least one of polymers containing positive fixed charge groups including quaternary ammonium, guanidinium, phosphonium, and their derivatives.

In one embodiment, the one or more anion exchange polymers include at least one of polymers based on polyarylene or on aliphatic hydrocarbon backbone. In one embodiment, the one or more anion exchange polymers includes quaternized poly(phenylene oxide) (QPPO).

In one embodiment, the anion exchange polymer is a polymer with a styrene backbone with imidazolium groups on the backbone. An example of an imidazolium-functionalized styrene is Sustainion™.

In certain embodiments, the CEM includes a mixture of two or more cation exchange polymers, and the AEM includes a mixture of two or more anion exchange polymers.

Embodiments of the BPM can be used to separate a cathode and an anode, as well as isolate the reactants and/or products associated with the cathode and isolate the reactants and/or products associated with the anode. Embodiments of the BPM can also be configured to manage flux of chemical species from the BPM to the cathode and/or to the anode. For example, the BPM can be used to provide a flux of protons to the cathode and a flux of hydroxide ions to the anode. This may generate an electrochemical device that can eliminate or reduce undesired crossover of chemical product between the cathode and anode. This can also allow the electrochemical device to operate with the anode and cathode at two different stable electrolyte pHs, even under long-term operation.

In some embodiments, the bipolar membrane can include a cation exchange membrane and an anion exchange membrane. In some embodiments, the bipolar membrane can be configured to promote dissociation reactions. In some embodiments, the bipolar membrane further can have a membrane catalyst. In some embodiments, the membrane catalyst can be at least one of a silicate, an amine polymer, and a graphite oxide. In some embodiments, the anion exchange membrane can be laminated by a cation-exchange polymer film. In some embodiments, the cation-exchange polymer film can be a sulfonated tetrafluoroethylene-based fluoropolymer-copolymer. In some embodiments, the cation-exchange polymer film can be a sulfonated poly(ether ether ketone) polymer. In some embodiments, the cation-exchange polymer film can be a polymeric weak acid, such as poly(acrylic acid). In some embodiments, the cation-exchange film can contain an inorganic cation exchanger such as a clay, a layered transition metal oxide, or graphite oxide, either alone or as a polymer composite. In some embodiments, a surface of the cation exchange membrane can be patterned and/or a surface of the anion exchange membrane can be patterned. In some embodiments, the cathode can include a cathode catalyst. In some embodiments, the cathode catalyst can be platinum, gold, silver, copper, indium, bismuth, lead, tin, tellurium, and/or germanium. In some embodiments, the cathode catalyst can be mixed with a binder, a polymeric electrolyte coating, and/or an ionic liquid. In some embodiments, the anode can include an anode catalyst. In some embodiments, the anode catalyst can be at least one of iridium oxide, ruthenium alloys, mixed oxides of ruthenium containing iridium and/or platinum, mixed metal oxides containing cobalt, nickel, iron, manganese, lanthanum, cerium, copper, nickel borate, cobalt phosphate, NiFeOx.

Figure 3:
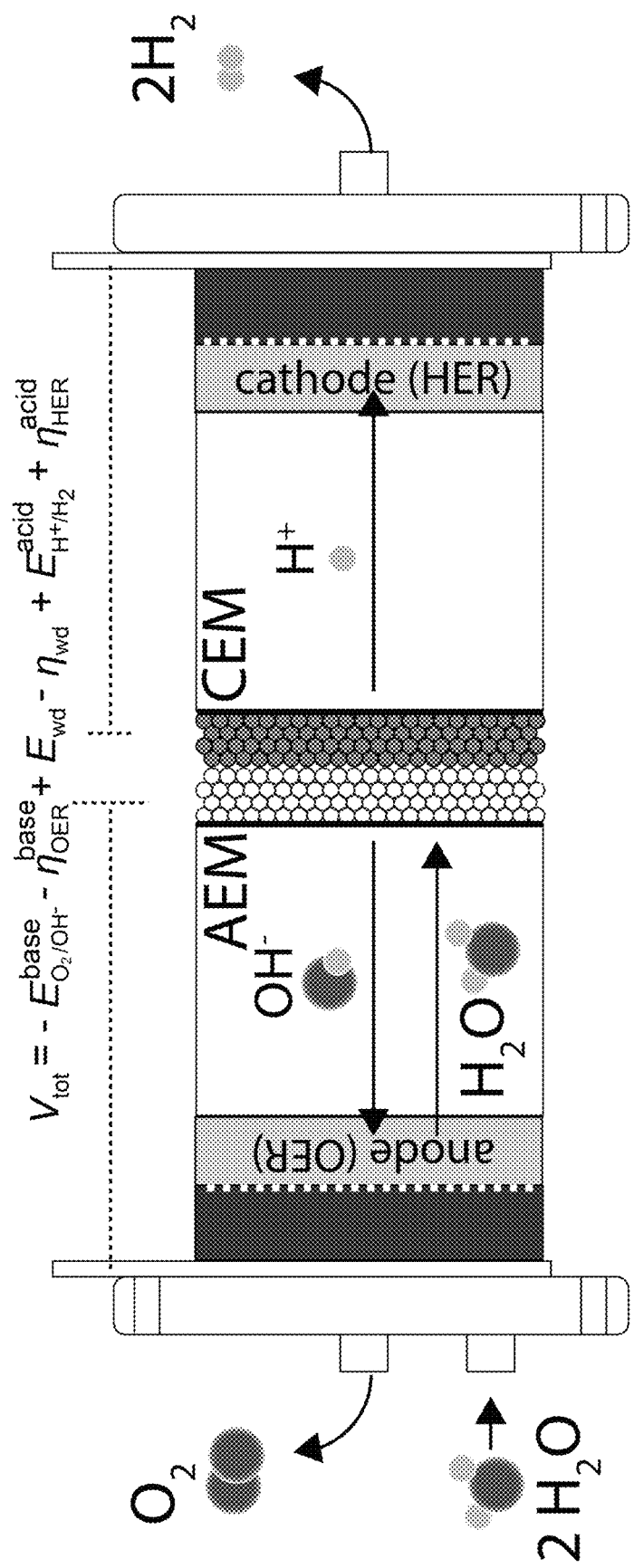
FIG. 3 is a schematic representation of a water-electrolysis device using only pure water as a feed. The applied $V_{tot}$ is negative, associated with the positive $\Delta G_{rxn}$ of water electrolysis. We define $\eta_{wd}$ as a positive quantity.

Also disclosed herein is a BPM electrolyzer that operates in the absence of soluble electrolyte and also allows measurement of the WD kinetics (see FIG. 3). It has been discovered that the rate of WD on metal-oxide nanoparticle surfaces is affected by local pH and correlates with the oxide's point of zero charge. Combining WD catalysts efficient in locally acidic conditions with those efficient in basic conditions, nearly eliminates the WD overpotential in BPM electrolyzers operating at 20 mA cm$^{-2}$. WD activity in the BPM is correlated with electrocatalytic activity for the alkaline hydrogen-evolution reaction. This finding shows the central role of WD in both cases, enabling advanced electrocatalyst design.

The electrochemical device can have a cathode with at least one of a liquid-electrolyte style electrode and a gas-diffusion electrode. The electrochemical device can have an anode with at least one of a liquid-electrolyte style electrode and a gas-diffusion electrode. The electrochemical device can have a BPM separating at least a portion of the cathode from at least a portion of the anode. The electrochemical device can have a cathode flow medium comprising carbon or other conducting material. The electrochemical device can have an anode flow medium comprising titanium, steel or other conducting material. The electrochemical device can have a frame configured to hold the cathode flow medium, the cathode, the BPM, the anode, and the anode flow medium together.

In some embodiments, at least one of the cathode flow mediums and the anode flow medium has at least one of a cell inlet and a cell outlet. In some embodiments, the frame has at least one pass-through region corresponding with at least one of the cell inlets and the cell outlet. In some embodiments, the frame seals the electrochemical cell except for at least one pass-through region. In some embodiments, the cathode has a cathode catalyst configured as a reduction catalyst. In some embodiments, the anode has an anode catalyst configured as an oxidation catalyst.

The BPM disclosed herein can be used in electrochemical devices for gas phase electrolysis and bipolar membrane electrolysis. Embodiments of the electrochemical device can be configured to generate an output product from an input product and electrical power. The input product can be a gas, a liquid, a solid or combinations thereof e.g. a slurry, gas having solid particulates entrained therein, a liquid having solid particles entrained therein, etc.). The output product can be a gas, a liquid, a solid, or a combination thereof (e.g. a slurry, a gas having solid particulates entrained therein, etc.). In some embodiments, both the input product and the output product include a gas. In some embodiments, the output product can be a reduced chemical product of the input product, an oxidized product of the input product, and/or a combination of both.

In some embodiments the electrochemical device can be configured as an electrolyzer. For example, embodiments of the electrochemical device can be configured to use electric current to drive chemical reactions that may facilitate generating the output product from the input product. In some embodiments, the electrochemical device can be configured as a carbon dioxide ($CO_2$) electrolyzer. As a non-limiting example, the electrochemical device can be configured to receive carbon dioxide ($CO_2$) gas as an input product at the cathode. Reactions within the electrochemical device 10 can generate carbon monoxide (CO) or any other hydrocarbon-based reduction product, water ($H_2O$), and/or hydrogen ($H_2$) and oxygen ($O_2$) as an output product. The CO, the $H_2O$, and/or the $H_2$ and $O_2$ may be caused to exit the electrochemical device for capture or further processing. In some embodiments, the $H_2O$ can be caused to self-ionize at the membrane via dissociation to generate protons ($H^+$) and hydroxide ions ($OH^-$). $H_2O$ can be introduced into the electrochemical device as input product at the anode, cathode, or directly to the membrane. The additional $H_2O$ can be in the form of a liquid or a vapor. The $OH^-$ formed by the dissociation of water may be used to react with the anode as electrolyte of the electrochemical device to generate oxygen ($O_2$), or other oxidized chemical, as additional output product. The $H^+$ formed by the dissociation of water may be used to react with the cathode as electrolyte of the electrochemical device to generate hydrogen ($H_2$), or other reduced chemical, as additional output product. The $O_2$ and $H_2$ and/or the other chemical products may be caused to exit the electrochemical device for capture or further processing.

Disclosed herein a BPM electrolyzer architecture (see FIG. 3) to measure WD kinetics of over 40 metal and metal-oxide nanoparticle assemblies, comprised of more than 30 different materials. It was discovered that the local-pH environment under which WD operates (acidic in the region next to the CEM and basic in the region next to the AEM) significantly influences the WD overpotential, $\eta_{wd}$. The WD overpotential, $\eta_{wd}$, is discussed in the context of an acid-base mechanism and the point of zero charge of the WD catalyst surface. It was discovered that novel double-layer catalysts nearly eliminate $\eta_{wd}$ at 20 mA cm$^{-2}$. Certain embodiments of the BPMs (e.g. NiO nanoparticles on AEM and IrO$_2$ nanoparticles on CEM surface) have a remaining WD overpotential of 8 mV at 20 mA cm$^{-2}$ with a measurement error of 9 mV of the characterization method.

EXAMPLES

In one example, a BPM water-electrolysis test station was built (FIG. 3), and fed only with pure 18.2 MΩ·cm water. The BPMs are encompassed in a membrane-electrode assembly (MEA) that is held under pressure by rigid Ti/Pt-frit current collectors that ensure constant physical contact between the layers (gas diffusion electrodes, membranes and WD catalyst) and prevent delamination. As different WD catalysts were studied, the materials and preparation parameters used in MEA construction were kept constant. The voltage needed for BPM water electrolysis ($V_{tot}$) can be conceptually decomposed into: (i) the thermodynamic potential associated with generating O$_2$ in alkaline media and H$_2$ in acidic media ($E_{H+/H2}^{acid} - E_{O2/OH-}^{base} = -0.40$ V at standard conditions), (ii) the OER and HER overpotentials at the specified current density ($\eta_{oer}$ and $\eta_{her}$, respectively), (iii) the thermodynamic potential for WD ($E_{wd}^{td} = -0.83$ V at standard conditions), (iv) the WD overpotential ($\eta_{wd}$) (we define $\eta_{wd}$ as a positive quantity here), and (v) the voltage drop due to series resistance which is negligible at the current densities for the MEA setup (27). It was found that that $V_{tot}$ is highly sensitive to the specific WD catalysts used.

Figure 4:
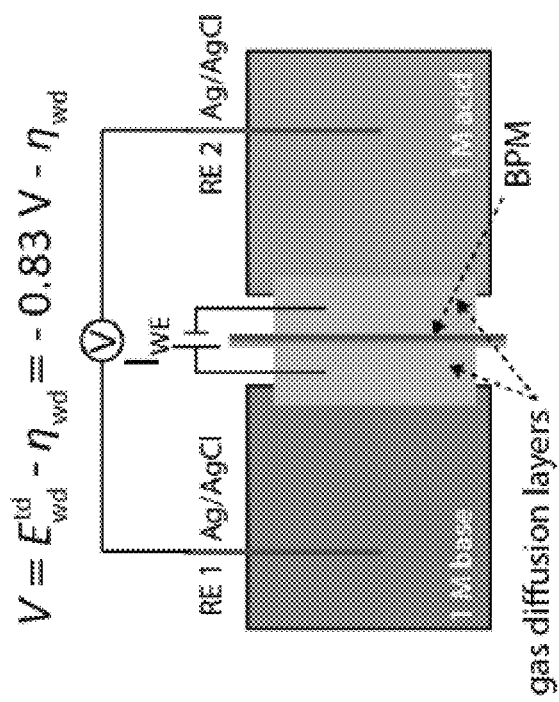
FIG. 4 is a schematic representation of an H-cell that allows for the direct measurement of $\eta_{wd}$ to calibrate measurements in the electrolysis setup.
Figure 5:
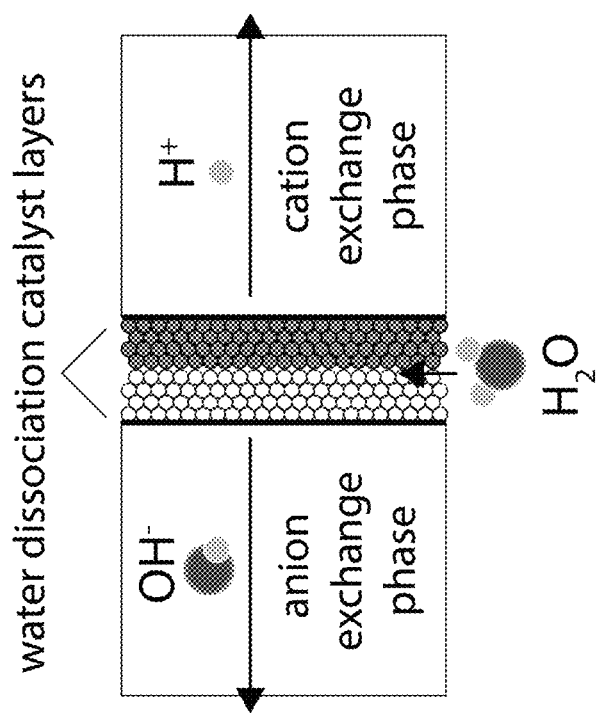
FIG. 5 is another schematic representation of a BPM showing any material can be used in the anion and cation exchange phase, for example, including both organic polymer and inorganic-based selective ion conductors. As disclosed herein, at least two different WD catalysts can be included in the WD catalyst layer.
Figure 6:
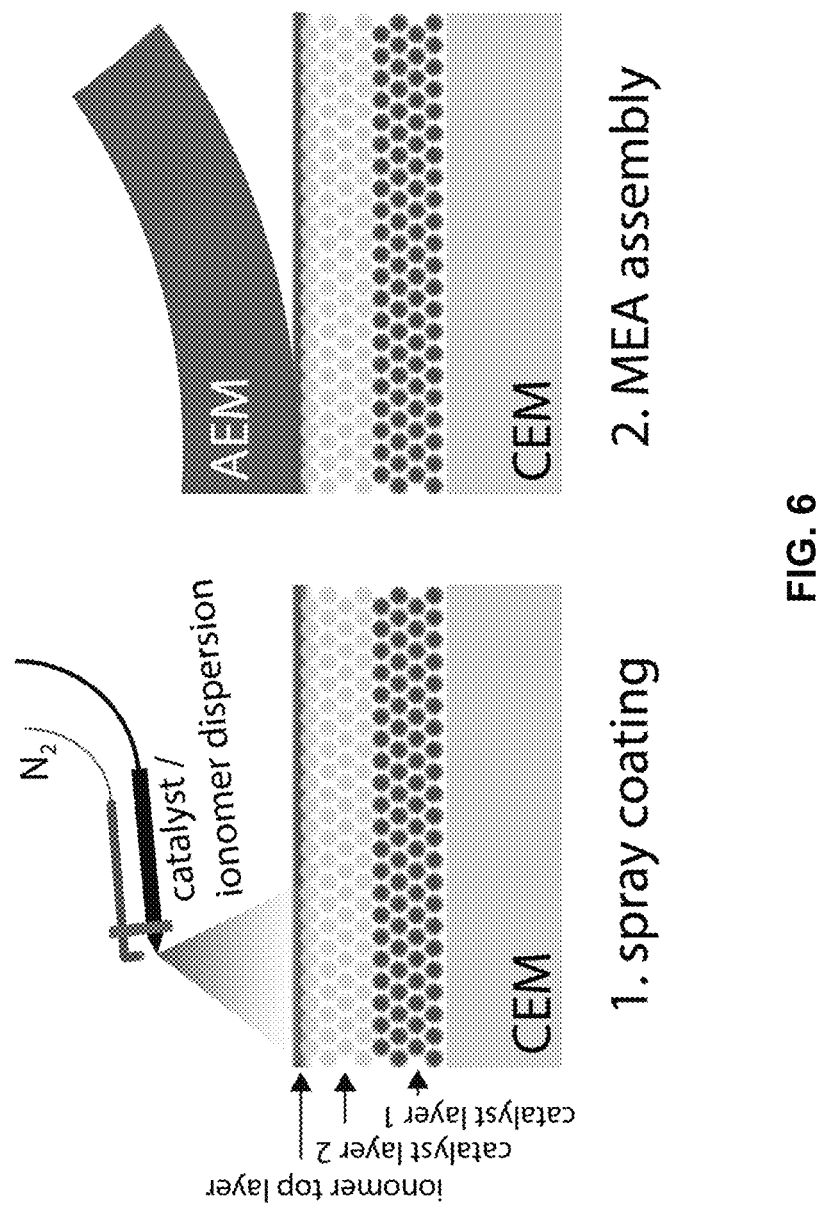
FIG. 6 is a schematic representation of one embodiment of a method for fabricating a BPM as disclosed herein where nanoparticle catalysts are spray-coated onto the membrane which is subsequently placed under constant pressure in the membrane electrode assembly FIGS. 7A and 7B. WD overpotentials correlate with the point of zero charge (PZC) for oxide nanoparticles.

To quantify $\eta_{wd}$ independent of the anode and cathode reactions, a custom H-cell was also built that maintains the BPM MEA under pressure while contacting the CEM with 1 M H$_2$SO$_4$ and the AEM with 1 M KOH (FIG. 4). The electrostatic potential across the BPM junction was measured using two pH-independent reference electrodes (Ag/AgCl) in the basic and acidic compartments while a constant current was passed between the anode and cathode. Because high-conductivity electrolytes are used and the anode and cathode are in direct contact with the BPM, solution iR potential drops between the BPM and reference electrode are insignificant. By measuring a BPM made with the same IrO$_2$ WD catalyst in both the H-cell and electrolyzer we calculate a theoretical electrolyzer baseline that would be obtained if $\eta_{wd}=0$ V. Differences in experimental data from this baseline allow us to quantify $\eta$wd from electrolyzer measurements made with other WD catalysts. The calibration results are in agreement with data from reference AEM and CEM electrolyzers. Remarkably, the best BPM electrolyzers outperform AEM electrolyzers made with the same anode and cathode electrocatalysts and Sustainion alkaline membrane.

The use of electrolyzer measurements to study the WD kinetics inside the BPM junction instead of the conventional H-cell approach is beneficial. Pure-water feed is used, thereby eliminating the effects of impurities, mobile charge-compensating co-ions (e.g. K$^+$, Cl$^-$), and acid-base recombination in the BPM junction that might lead to catalyst dissolution. In the BPM electrolyzer, current is carried by H$^+$ and OH$^-$ from dissociated water. Current associated with possible catalyst dissolution is insignificant. IrO$_2$ WD catalysts were used to calibrate the electrolyzer with the H-cell measurements because IrO$_2$ is stable under both strongly acidic and alkaline conditions.

Using the calibrated BPM electrolyzer, WD kinetics of metal-oxide nanoparticles deposited in the BPM junction were systemically studied (see Table 2 below for the list of materials used). It was found that $\eta$wd is relatively insensitive to WD-catalyst-layer thickness, once the membrane surface is covered with a catalyst film ~100-200 nm in thickness, suggesting that WD is confined to a near membrane region. Because metal-oxide surfaces exhibit polyacid/polybase behavior, their surface chemical structure and protonation state depends on the local pH. The CEM surface constitutes an acidic environment while the AEM surface is alkaline. To study the WD catalysis under a specific local-pH environment, a stable WD catalyst was used at one membrane surface (e.g. NiO at the AEM, which is stable in a basic environment, or Sb:SnO$_2$ at the CEM, which is stable in an acidic environment) while systematically varying the WD catalyst at the other membrane surface.

A correlation exists between the WD overpotential (in the double-layer geometry) and the metal oxide's point of zero charge (PZC, the pH at which the oxide surface is electrically neutral) estimated via zeta-potential measurements (Table 2) as shown in FIG. 13. With NiO on the basic AEM surface, the best WD catalysts on the acidic CEM surface are those with PZCs in the acidic range near 1-2. With Sb:SnO$_2$ on the acidic CEM surface, the best WD catalysts on the basic AEM surface are those with PZCs in the basic range >12.

The dependence of the WD activity on the PZC might be explained by an acid-base mechanism, similar to the one proposed for the catalysis on the membrane polymer end groups facing the bipolar junction. Under basic conditions at the AEM, most oxide surfaces are negatively charged and likely consist of structurally diverse —OH and —O$^-$ species. These sites can act as proton donors or acceptors, respectively, catalyzing WD via a two-step mechanism:

$$MO^- + H_2O \leftrightarrow MOH + OH^- \quad (1)$$

$$MOH + H_2O \leftrightarrow MO^- + H_3O^+ \quad (2)$$

Under acidic conditions at the CEM, most oxide surfaces will be significantly protonated, consisting of —OH2+ and —OH species, and can similarly catalyze WD:

$$MOH_2^+ + H_2O \leftrightarrow MOH + H_3O^+ \quad (3)$$

$$MOH + H_2O \leftrightarrow MOH_2^+ + OH^- \quad (4)$$

A large net rate for either of the above two-step mechanisms require significant concentrations of both the protonated and unprotonated surface species (assuming similarity of the forward rate constants), so that both steps are simultaneously fast. At local pH values near the PZC, there should be diversity of surface-protonation states capable of driving both steps. The surface speciation of oxides, however, is complex. Oxides are typically represented by a pKa spectrum as opposed to well-defined discrete pKa values. TiO$_2$ and SiO$_2$, the outliers in FIG. 7, work well for WD in both acidic and basic environments. This is consistent with the broad pH-stability of TiO$_2$ and SiO$_2$ and the presence of surface pKa values that span both acidic and basic regions. Several oxides, e.g. NiO, are unstable if placed in the acidic environment at the CEM surface and will generate soluble Ni$^{2+}$ that will ion-exchange for H$^+$ in the CEM and degrade performance.

Figure 7B:
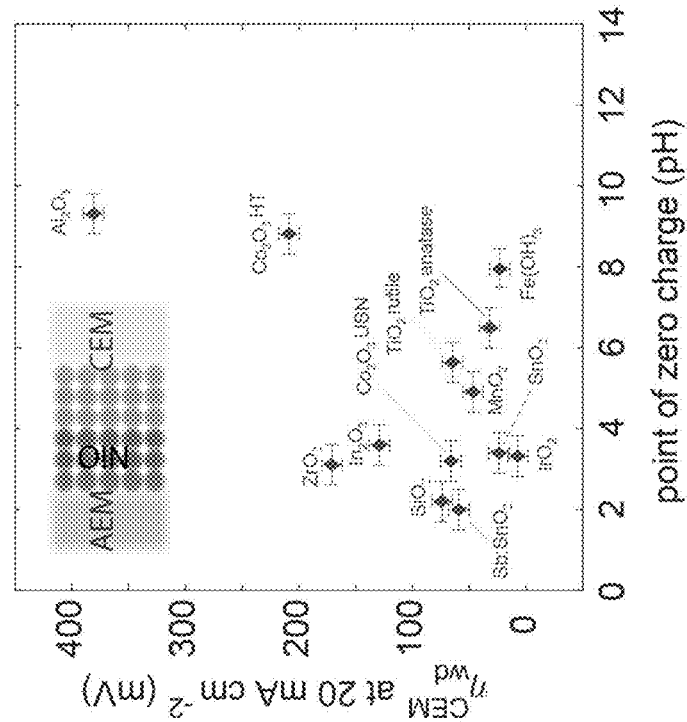
(FIG. 7B) WD overpotentials measured with catalysts placed under locally acidic conditions in the BPM, by using base-stable NiO to cover the basic CEM ($\eta_{wd}$CEM). The PZCs of the particles (at the solvent shear plane) were estimated by finding the pH where the zeta potential tended to zero.
Figure 7A:
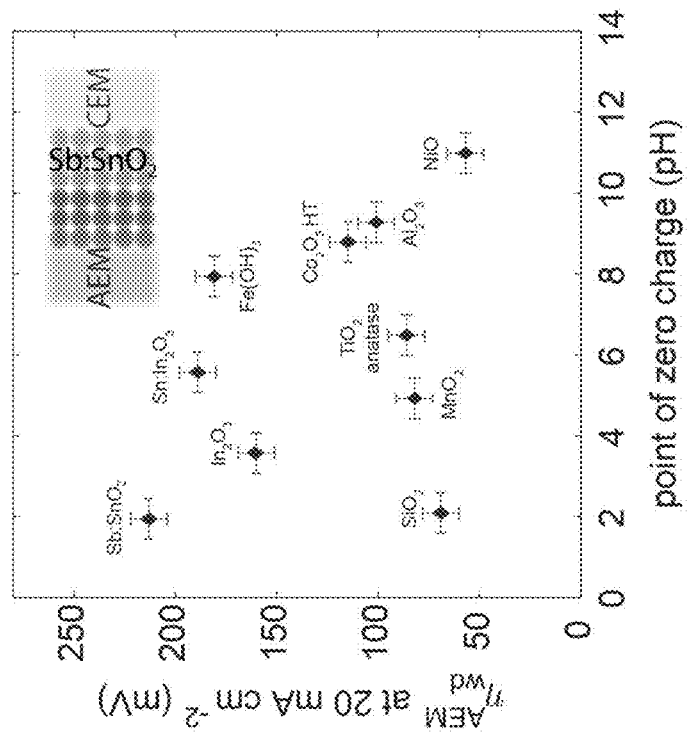
(FIG. 7A) WD overpotentials measured with catalysts placed under locally alkaline conditions in the BPM, by using acid-stable Sb:SnO$_2$ to cover the acidic CEM ($\eta_{wd}$AEM).
Figure 9:
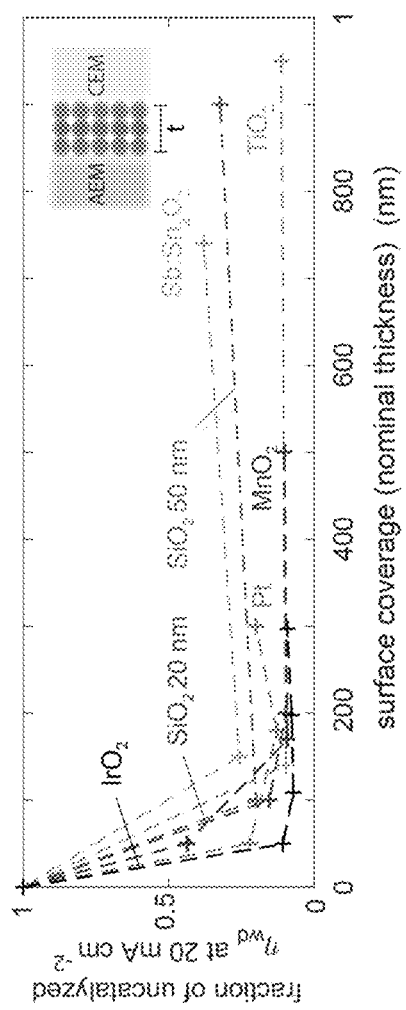
FIG. 9. Thickness/coverage-dependence of single WD catalyst layers. All catalysts show a substantial reduction in $\eta_{wd}$ after the first ~100-200 nm of nanoparticle catalyst film is added. Further loading tends to decrease performance.

The results shown in FIG. 7 are useful for tuning WD reactivity in aqueous environments. Previous studies showed that the addition of metal or metal-oxide species via electrodeposition or precipitation from metal salts or in the form of nanoparticles, e.g. $Al_2O_3$ or $Fe(OH)_3$, enhance WD kinetics to varying extents in BPMs. However, these experiments, utilizing only single catalyst materials, did not account for the different local-pH environments that affect both the stability of the catalyst to dissolution and the surface/chemical structure. The apparent fundamental relationship of WD activity and PZC was thus obscured and the resulting BPM performance inferior.

The importance of WD catalysis is not limited to BPMs. During the HER in alkaline media ($2H_2O+2e-\rightarrow H_2+2OH^-$), the first step ($H_2O+e-\rightarrow H_{ad}+OH^-$) involves WD and metal-hydride intermediate formation. It is often argued that WD is rate limiting and the reason HER is generally slower in base than in acid, although other effects have been suggested. The OER under acidic or neutral conditions, $2H_2O\rightarrow O_2+4H^++4e-$, likewise requires WD to generate absorbed hydroxide species that can be further oxidized. This WD step, however, is not thought to be rate-limiting for the OER. A fundamental challenge, however, has been the inability to isolate and measure the kinetics of WD for a particular electrocatalyst independently of other electrochemical processes.

The BPM electrolyzer was used to further measure $\eta_{wd}$ of common HER and OER electrocatalysts and correlated these values to electrocatalytic overpotentials (at similar current density) measured for the same particles in a standard three-electrode cell as shown in FIG. 8. The HER activity of precious-metal nanoparticles in 1.0 M KOH correlates with WD overpotentials measured at the basic AEM surface (with the same $IrO_2$ layer on the CEM side). When HER overpotentials for those metal nanoparticles are measured in 1.0 M $H_2SO_4$, where WD is unimportant for HER, they are not correlated with $\eta_{wd}$. As $\eta_{wd}$ tends to zero, so does the base HER overpotential at a similar current density.

The above correlation is consistent with showing that modification of metals like Pt with metal hydroxides such as $Ni(OH)_2$ improve alkaline HER activity, apparently by increasing WD kinetics via a bifunctional mechanism. Our data confirms that NiO (which is hydroxylated under aqueous conditions) is an excellent alkaline WD catalyst, and further enables the design of new electrocatalysts. $TiO_2$ is an active WD catalyst in both acid and base and is chemically stable. We deposited $TiO_2$ by atomic layer deposition (ALD) onto Pt, Ir, Ru, Rh, PtRu and PtIr nanoparticles at 250° C. (5-20 cycles). The addition of $TiO_2$ simultaneously decreased both the WD and alkaline-HER overpotential, supporting a bifunctional mechanism where the oxide facilitates WD and the metal stabilizes hydride intermediates.

In contrast to alkaline HER, a strong correlation was not found between the OER in acid (where WD is needed) and ηwd measured for the same nanoparticle catalysts placed on the acidic CEM in the BPM (FIG. 8C). This is consistent with computational models of the OER mechanism indicating that the third electrochemical step is rate limiting, and not WD. It is, however, interesting that fast acid OER catalysts, such as $RuO_2$ and $IrO_2$, are also apparently fast WD catalysts.

While the stability of the WD catalysts in the BPM have not yet been studied extensively, the observed trends (FIGS. 7 and 8) cannot be explained by differences in WD catalyst stability nor dissolution rates. The electrolyzer measurements use only pure-water without soluble electrolyte, and therefore crossover of acid/base into the BPM junction is avoided. The rate of voltage increase for the BPM electrolyzer is not correlated with ηwd, as would be expected if catalyst dissolution led to additional current-carrying ions or was coupled to WD. Furthermore, the best WD catalysts ($IrO_2$ in acid and NiO in base) are not expected to substantially dissolve based on thermodynamic data.

The BPMs fabricated here also have faster WD kinetics than those previously reported. The best BPMs, e.g. with NiO or $Ir/TiO_2$-10 c at the 15 AEM surface and $RuO_2$ or $IrO_2$ at the CEM surface, show ηwd that is within measurement error (±9 mV) of 0 mV at 20 mA $cm^{-2}$. Commercial membranes, e.g. from Fumatech, show WD overpotentials ranging from 100-200 mV (depending on pretreatment) under equivalent test conditions and studies of custom BPMs generally indicate similar or higher $\eta_{wd}$. Further improvements, i.e. through meso/microporosity engineering in the WD catalyst layers or via fabrication of three-dimensional interpenetrating AEM/CEM junctions, are possible and may allow for negligible $\eta_{wd}$ at technologically relevant current densities >1 A $cm^{-2}$.

Such high BPM performance suggests electrochemical applications where the anode process can be independently optimized to run at a different pH than the cathode process, while WD is driven, with negligible voltage loss, in the AEM/CEM junction. This is in contrast to conventional monopolar membrane processes, for example, water electrolysis, where WD is inherently coupled to HER when AEMs are used, and to the OER when CEMs are used. Such flexibility in local-reaction pH might enable high-performance BPM electrolyzers using record-activity non-precious-metal OER catalysts (e.g. $NiFeO_x$) in an alkaline environment with high-activity non-precious-metal phosphide/sulfide HER catalysts in an acid environment, flow batteries that use anolyte and catholyte at different pHs, (regenerative) fuel cells, and direct $CO_2$ electrolyzers that prevent crossover of soluble co-ions.

Materials and Methods

Nanoparticle Water Dissociation (WD) Catalysts $Co_2O_3$, $Co:FeO_x$ and $Co:NiO_x$ were synthesized via a hydrothermal method. 2 mmol metal acetate hydrate was dissolved in a mixture of 14 mL ethanol (98%) and 1.2 mL ultrapure water with vigorous stirring and sonication. For $Co:FeO_x$ and $Co:NiO_x$, a 1:1 molar ratio of iron acetate to cobalt acetate or nickel acetate to cobalt acetate, respectively, was used. 2.5 mL of 25% aq ammonia was added to the solution and the precursor solution was stirred until all residual metal acetate hydrate dissolved. Subsequently, the solution was transferred into a 45 mL Parr bomb, sealed, and then heated at 150° C. for 3 h. The synthesized nanoparticles were centrifuged and washed with water three times and ethanol one time. Afterwards, the dispersions were dried at 80° C. until all the solvent evaporated. All other nanoparticles were purchased from commercial sources as indicated in Table 2.

Atomic Layer Deposition (ALD) of $TiO_2$

Nanoparticle powder (~200 mg) was distributed over flat, dish-shaped aluminum foil (~4 cm×4 cm) creating a homogenous nanoparticle layer. The aluminum dish was then covered with a fine steel screen to prevent substantial quantities of particles from being carried away by the precursor and $N_2$ flows during the ALD process (Savannah S100, Ultratech). Another metal mesh with a larger metal grid was bent and placed onto the covered aluminum dish in such a way that the lid of the chamber pushed the additional metal mesh down and ensured the fine mesh was held rigidly in place during the ALD process. The growth temperature of the chamber was set to 250° C. The pulse times were set to 0.05 s for the water precursor and 0.5 s for $Ti(NMe_2)_4$ (TDMAT) with $N_2$ purge times of 60 s after each step to ensure full removal of the precursors from the nanoparticle powders after each pulse. After the ALD process, the nanoparticle powders were transferred into glass vials.

Membranes and Ionomers

The cation exchange membrane, Nafion® 212, was purchased from the Fuel Cell Store. The as-received membrane sheets were cut into ~4×4 cm$^2$ pieces and soaked in deionized water for at least one day. Nafion® D520 dispersion (5 wt % in ethanol) was used as ionomer for the cathode preparation (below). The anion exchange membrane Sustainion X37-50 was purchased from Dioxide Materials. The as-received membranes were cut into ~4×4 cm$^2$ pieces and soaked in 1 M KOH for one day, after which the membranes were rinsed and immersed again into a fresh 1 M KOH solution for another day to complete the ion-exchange. Prior to the BPM assembly, the membranes were rinsed in deionized water. The compatible AEM ionomer, Sustainion XA-9 (25 wt % in ethanol) was used for the anode preparation (below).

Anode and Cathode Catalyst Dispersions.

100 mg of catalyst powder were dispersed in a mixture of 0.5 g H$_2$O, 1.7 g isopropyl alcohol and 100 mg ionomer solution. For the cathodes, Pt black and Nafion® D520, and for the anode, IrO$_2$ and Sustainion XA-9, were used. The dispersions were sonicated for at least 30 min or until all the nanoparticles were fully dispersed.

Anode and Cathode Preparation

For the cathodes, 2×2 cm$^2$ pieces of Toray paper 090 (Fuel Cell Store) and for the anodes, 4 cm$^2$ sintered Ti frits electroplated with 1 μm Pt (purchased from Yinggao Metal Materials Co., Baoji in Shanxi province, China) were used as gas-diffusion layers (GDLs). Pt black and IrO$_2$ (5-10 nm, Fuel Cell Store) were used as cathode and anode catalyst, respectively, throughout all measurements. Before spray coating the catalyst/ionomer dispersion on a hotplate at 80° C., the weight of the GDL substrate was recorded. The spray coating was stopped after the loading reached 2 mg cm$^{-2}$. To improve the interface of the anode with the AEM and the cathode with the CEM, a thin layer of Sustainion XA9 (1-2 wt % in ethanol) and Nafion® D520 (5 wt % in ethanol), respectively, were sprayed on top of the catalyst-coated GDLs until the weight reached 10% of the total dry catalyst-ionomer loading (i.e. 0.2 mg cm$^{-2}$). The anodes were then soaked in 1 M KOH for at least 1 h to fully ion-exchange the ionomer. The cathodes were used as prepared.

Preparation of Single and Double-Layer WD Catalysts

Nafion® pieces 4×4 cm$^2$ were placed flat onto a glass dish and residual water drops on the surface carefully removed with a clean laboratory tissue. The membranes were then fixed with tape to prevent wrinkling during the subsequent spray coating of the WD catalyst nanoparticles at 100° C. inside a fume hood. The exposed surface area (subtracting the taped edges) of the Nafion® pieces was ~10 cm$^2$.

For the WD catalyst dispersions, 0.5 g of water, 1.7 g of isopropyl alcohol and a fixed amount of catalyst powder were sonicated for over 1 h to ensure good dispersion. The mass of WD catalyst was calculated, taking into consideration the density of the material, the target thickness (~200 nm unless otherwise noted), the Nafion® surface area (~10 cm$^2$), and the material loss during the spray coating process. To determine the material loss, five ~10 cm$^2$ Si wafer pieces (with the same size as the target area of the Nafion® membranes) were used as substrates. The Si was weighed, a known amount of catalyst powder was spray coated onto the substrates (at 100° C.), and the weight was recorded again. During those reference measurements, the spray coating gun was held at the same distance and angle from the substrate as during the actual sample preparation. Afterwards the loss per slide was averaged over the five substrates and determined to be ~90%. To prepare the double-layer catalyst layers, a second layer was spray coated onto the first layer (that was directly on Nafion®). For the noble-metal WD catalyst that was incorporated on the basic side (AEM surface) after assembly (such as Ir and PtRu) ~14 mg XA9 ionomer solution was added to the catalyst mixture to aid dispersion. During all WD-catalyst spray-coating steps, the distance of the spray-coating gun to the substrate was held constant (~20 cm). Membranes with defects after WD catalyst coating (such as wrinkling) were rejected.

After the WD catalyst spray coating, the tape at the edges of the Nafion® was removed inside the fume hood. To aid the removal of the Nafion®, and avoid exerting unnecessary force on the catalyst layers (e.g. via peeling of the Nafion®), water was carefully pipetted over the catalyst-coated membrane. The Nafion® absorbed the water and expanded which led to slow delamination from the glass dish. The catalyst-coated membrane was then placed with two tweezers into a water-filled glass dish to rehydrate.

Assembly of BPM MEAs

The electrodes and membranes were assembled into a bipolar membrane-electrode-assembly (MEA), which was integrated into an electrolysis setup. First, the anode GDL with the IrO$_2$ catalyst layer and several gaskets were placed onto corrosion-resistant stainless-steel back plates containing serpentine flow channels (for the supply of ultrapure water and the transport of evolved O$_2$). Then, the Sustainion AEM was placed onto the catalyst-coated GDL and gaskets ensuring a wrinkle-free interface. Next, the Nafion® membrane with WD catalyst layers was carefully placed on top of the AEM with the WD catalyst layers facing the AEM, again, such that no wrinkled area or other irregularities were formed. Then additional gaskets and the Pt catalyst-coated cathode GDL were placed on top of the stack. Finally, a graphite block with serpentine flow channels (for the removal of the produced H$_2$) was placed on top. The whole electrolyzer assembly was tightened with screws that are equally spaced around the edge of the metal block by a torque wrench (6 Nm). This type of MEA assembly is a standard in AEM and PEM electrolyzers as well as fuel-cell studies. Yet, it is not a standard for BPM studies, although it provides excellent physical adhesion between all layers due to the constant pressure of the anode and cathode GDLs which themselves are supported and sandwiched between fully rigid graphite and stainless-steel plates. Importantly, it also allows operation of the BPM MEA with ultrapure water due to the direct contact between membranes and electrodes.

Electrolyzer Measurements:

For the polarization curves, the power supply was stepped from 2.5 to 50 mA cm$^{-2}$ in 2.5 mA cm$^{-2}$ steps, while deionized water at 50° C. and at 300 ml min$^{-1}$ was supplied via the serpentine flow channels of the stainless-steel metal block. The voltmeter output (measured directly at the current-collector plates to avoid the series resistance in the cables from influencing the measurements) was recorded for 1 min at each current density step. The last voltage value of each time interval was used to plot the polarization curves. The data show that a voltage plateau is reached after the first few seconds of each current density step, indicating a quasi-steady state and allowing for reliable comparison of polarization curves of different BPM electrolyzers. The current density is held constant for 1 min before recording the final voltage value.

Determination of $\eta_{wd}$=0 V Baseline for Electrolyzer and Error Estimates:

To determine the theoretical response of the BPM electrolyzer with $\eta_{wd}$=0 V, we compared the results of several BPMs made with a single $IrO_2$ WD catalyst layer between the electrolyzer (with the standard $IrO_2$ anode OER and Pt cathode HER catalysts) and custom-built H-cell setup at the same temperature (see below for details). From the average values and the spread of the individual polarization curves we determined the error (one standard deviation) to be ~5 mV for the H-cell measurements and ~8 mV for the electrolyzer measurements. As a result, the final error in FIGS. 13 and 14 is ~±9 mV.

H-Cell Measurements:

The potential drop across the bipolar membrane junction can be measured directly by using two pH-insensitive reference electrodes (Ag/AgCl) in two adjacent compartments filled with 1 M acid and 1 M base electrolyte. The concentration of $Cl^-$ ions (and hence their chemical potential) is constant in both reference electrodes and, as a result, the electrochemical potential difference between the two Ag/AgCl reference electrodes is determined only by the electrical potential difference across the bipolar membrane junction. Because the acid and base are both kept at high concentrations similar to their concentrations in the membrane, the electrostatic (Donnan) potentials developed across the aq. 1 M KOH|AEM and aq. 1 M $H_2SO_4$ CEM interfaces are minimized We also measure each Ag/AgCl reference electrode relative to each other in the same acidic or basic electrode compartment prior to each BPM measurement and correct for small differences between the reference electrodes in the final measurement.

The H-cell measurements reported here, differ in one important way from those typically used. Here, the working and counter 50 electrodes, Pt-coated sintered Ti that pass the current, are directly in contact with catalyst layer pressed against the BPM. Because concentrated acid/base are used in the H-cell to contact each side of the BPM, and the currents/distances are small, the iR potential drop through the electrolyte that permeates the gas-diffusion and catalyst layers is negligible. Therefore, the pH-insensitive reference electrodes that sense the electrostatic potential of the electrolyte can be placed exterior to the porous Ti/Pt frit current collectors and the Ti/Pt frit can be physically compressed by the H-cell design to mimic the environment inside the BPM electrolyzer.

Dynamic Light Scattering (DLS) for Electrophoretic Mobility

The point of zero charge was determined via electrophoretic mobility measurements by dynamic light scattering (Mobius, Wyatt Technology). The acquisition time was set to 30 s with a read interval of 1 s. The results were the average of 10 DLS acquisitions for each pH value. The voltage amplitude and the electric field frequency were 10 V and 10 Hz by default, respectively, but were adjusted to obtain a stable reading, depending on the pH. The Smoluchowski zeta-potential model was used. Before the measurements, the catalyst powders were dispersed at a low concentration (~1 mg catalyst/ml) in water and the pH was adjusted by adding KOH to make basic dispersions and HCl to make acidic dispersions. Then, the dispersions were sonicated for ~5 min and immediately transferred to a cuvette and the measurement started. Each measurement (which included an average >10 DLS acquisitions) was repeated at least three times to ensure accurate determination of the PZC. From those repeated measurements the reproducibility of the PZC measurement was determined to be ~±1 pH units for NiO, $SiO_2$, $RuO_2$ and Sb:$SnO_2$ (either very basic or acidic PZC) and ±0.5 pH units for the remainder of the catalysts. The results are shown in Table 2 below.

TABLE 2

| material | size (nm) | source | Experimental PZC (pH) | Literature PZC/IEP (pH) From M. Kosmulski, Surface charging and points of zero charge. (CRC Press, 2009). |
|---|---|---|---|---|
| $IrO_2$ | 5-10 | FCS | 3.3 | <2-3.3 |
| $RuO_2$ | 5-10 | FCS | (2-3) not reliable | 2.8-6.1 |
| Pt | 5-7.5 | FCS | inert | |
| Ir | 4-6 | FCS | inert | |
| PtRu | 3-5 | FCS | inert | |
| PtIr | 4-6 | FCS | inert | |
| Pd | 15 | USN | inert | |
| Rh | 15 | USN | inert | |
| Ru | 15 | USN | inert | |
| $TiO_2$- rutile | 30 | USN | 5.6 | 1.9-6.8 |
| $TiO_2$- anatase | 30 | USN | 6.5 | 1.7-6.8 |
| $SiO_2$ | 20 | NCX | 2.1 | 1-7.1 |
| $Co_2O_3$-USN | 50 | USN | 3.2 | 2.2-11.4 (including other oxidation states) |
| $Co_2O_3$-HT | 50-100 | HT | 8.8 | 2.2-11.4 (including other oxidation states) |
| NiO | 15-35 | USN | 11 | 3.5-12.7 |
| $MnO_2$ | 40 | USN | 4.9 | 2-10 (including other oxidation states) |
| $ZrO_2$ | 40 | USN | 3.1 | 3.5-9.5 |
| $SnO_2$ | 35-55 | USN | 3.4 | <2-7 |
| $Al_2O_3$ | 50 | USN | 9.3 | 3.6-11.4 |
| Sb:$SnO_2$ | 50 | USN | 2 | <1-3.7 |
| Sn:$In_2O_3$ | 20-70 | USN | 3.5 | 2.5-8.5 |
| $In_2O_3$ | 20-70 | USN | 3.6 | 5.4-9 |
| $Fe(OH)_3$ | 10 | USN | 7.9 | 4.5-8 |

Electrodes for Three-Electrode Measurements

The catalyst dispersions contained 20 mg catalyst, 0.5 mg water and 1.7 mg isopropyl alcohol and either 20 mg Sustainion XA9 (5 wt %) or Nafion® D520 (5 wt %) for the measurements in base and acid, respectively. The dispersions were sonicated for at least 30 min until homogenous and well dispersed. Glass slides were covered via electron-beam evaporation with 20 nm Ti and 50 nm Au or 20 nm and 50 nm Pt for measurements in acid or base, respectively. Afterwards the glass slides were weighed, exposed to $O_2$ plasma for 5 min, placed onto a hotplate at 80° C., and the dispersions spray coated onto the surface. The weight was recorded again and the spray coating continued until the loading reached ~0.3 mg cm$^{-2}$. Afterwards, some of the catalyst powder was removed at the edges of the substrates and a wire soldered to the metal-coated glass. The wire was fed through a glass tube which was then sealed with acid and base-stable epoxy (Loctite EA 9460 Hysol) which was dried at ~50° C. The geometric surface area of each electrode was determined by optical imaging on a flat-bed scanner.

Three-Electrode Measurements in 1 M Acid and 1 M Base

The electrodes were immersed in the electrolyte and, together with a Pt counter electrode and an Ag/AgCl reference electrode (in acid) or Hg/HgO reference electrode (in base), connected to a potentiostat (BioLogic SP200 or SP300). A spinning stir bar was placed close to the electrode surface to remove generated bubbles. The electrolyte was sparged with $N_2$ to remove dissolved $O_2$. We sparged one cell electrolyte with $H_2$ to quantify the effect of the local $H_2$ concentration on the overpotential determination. The effect was small for the current densities used for the correlation plots in FIG. 8. The cyclic voltammograms were collected by first performing two cycles at 50 mVs$^{-1}$, followed by an impedance measurement to estimate the uncompensated series resistance, and one final cycle at 2 mVs$^{-1}$, unless otherwise noted.

Complications of Conventional H-Cell Measurements

H-cell measurements of BPMs with acid and base in the adjacent compartments suffer from free acid and base transport into the BPM junction (enhanced by reduced ion-permselectivity of the membranes at high acid and base concentrations), thereby leading to significant water generation and sometime blister formation (often called "ballooning") inside the junction and possible dissolution of the WD catalysts. Therefore, often other neutral electrolytes such as NaCl, $Na_2SO_4$, or $NaClO_4$ are used in both H-cell compartments. Under reverse bias, water is dissociated in the junction and the generated OH$^-$ and H$^+$ are transported through the AEM and CEM, respectively, and into the salt solutions, however, because the activity (i.e. concentration) of OH$^-$ and H$^+$ are not controlled and change with time (and position), the thermodynamic potential for WD is not well defined. Often, significant current is observed before the "expected" thermodynamic onset BPM junction voltage of 830 mV; this is a manifestation both of co-ion (e.g. Na+, Cl−) transport and the fact that the H+ and OH− are not generated at unit activity. WD overpotentials estimated from such data should be taken with caution as they underestimate the true WD overpotential measured relative to well-defined reference states. Nonetheless, the use of NaCl or other salts in BPM studies is certainly justified from a practical point of view, i.e. if the application requires NaCl as electrolyte such as in electrodialysis.

Another complication for traditional H-cell measurements arises from the lack of physical pressure on the membranes, which can lead to delamination of the membranes and catalyst layers under operation. Often more-elaborate fabrication methods are used, such as exerting prolonged pressure on the BPM at high temperatures to promote polymer binding or using various additional polymers inside the BPs junction (e.g. S-PEEK, see Table 1 for details), all of which can alter the BPM junction and make comparison of different WD catalyst systems challenging. It also limits the achievable thickness of the WD catalyst layer. The BPM electrolyzer and pressurized BPM H-cell configuration reported here solve these problems.

Control Over Catalyst Location and Local pH Inside the BPM Junction

One innovation in the work reported here is the ability to study WD catalysis in both acidic and basic local environments. By placing a stable nanoparticle layer such that it covers one membrane, e.g. the CEM, and systematically changing the WD catalyst on the other membrane's surface, e.g. the AEM, we measure WD catalysis as a function of composition in a reasonably well-defined local-pH environment (the local pH will naturally depend on the distance from the membrane surface and the current density—the details of the H$^+$ and OH$^-$ gradients present requires numerical simulations coupled with operando experimental work to precisely determine).

Thickness-dependent measurements of single WD catalyst layers inside the BPM junction show that the WD overpotential is minimized for a nominal thickness of ~100-200 nm. For thicker WD catalyst layers, we hypothesize that ionic transport resistance across the WD catalyst layer increases the apparent overpotential. FIG. 10 shows SEM images of various nanoparticles 10 covering the Nafion® surface with a nominal thickness of ~200 nm. The images show the majority of the surface is covered with WD catalyst. This suggests that the most-important WD catalyst is located near the membrane surface (i.e. full coverage is important) and below a thickness of ~100 nm.

The WD catalyst layers in the bilayer systems have a nominal thickness of ~200 nm each to prevent physical contact of the WD-catalyst top layer with the bottom membrane, and of the bottom WD-catalyst layer with the top membrane surface. By comparing 15 single-layer junctions with double-layer junctions, substantial effects on $\eta_{wd}$ depending on the catalyst's local pH is evident.

NiO dissolves if applied directly onto the CEM (consistent with known NiO dissolution in acid), leading to degraded BPM performance Therefore, the effect of the NiO is not due to enhanced WD on the CEM surface (through possible penetration of the $IrO_2$ layer) but definitively due to enhanced WD on the AEM surface.

In view of the many possible embodiments to which the principles of the disclosed invention may be applied, it should be recognized that the illustrated embodiments are only preferred examples and should not be taken as limiting the scope of the invention.

What is claimed is:

1. A bipolar membrane comprising a first member comprising at least one anion exchange material; a second member comprising at least one cation exchange material, wherein the first member and the second member together form an interface junction; and disposed within the interface junction a first layer comprising a first water dissociation catalyst and a second layer comprising a second water dissociation catalyst, wherein the first water dissociation catalyst is different than the second water dissociation catalyst.

2. The bipolar membrane of claim 1, wherein the first water dissociation catalyst and the second water dissociation catalyst are each in the form of nanoparticles.

3. The bipolar membrane of claim 2, wherein the first water dissociation catalyst contacting a surface of the anion exchange material is selected from NiO, Pd, PtIr or Ir, and the second water dissociation catalyst contacting a surface of the cation exchange material is selected from Fe(OH)$_3$, $RuO_2$, or $IrO_2$.

4. The bipolar membrane of claim 1, wherein at least a portion of the first water dissociation catalyst contacts a surface of the anion exchange material, and at least a portion of the second water dissociation catalyst contacts a surface of the cation exchange material.

5. The bipolar membrane of claim 1, wherein the first member is an anion exchange membrane, and the second member is a cation exchange membrane.

6. The bipolar membrane of claim 5, wherein the first water dissociation catalyst contacting a surface of the anion exchange material is selected from Pd, PtRu, PtIr, Ir, Rh, NiO, $MnO_2$, $Al_2O_3$, $SiO_2$, anatase $TiO_2$, rutile $TiO_2$, or $Co_2O_3$.

7. The bipolar membrane of claim 5, wherein the second water dissociation catalyst contacting a surface of the cation exchange material is selected from $RuO_2$, $IrO_2$, anatase $TiO_2$, rutile $TiO_2$, $Fe(OH)_3$, $MnO_2$, Pt, $SiO_2$, $Sb:SnO_2$, $SnO_2$, $Co_2O_3$, $ZrO_2$, $In_2O_3$, Rh.

8. The bipolar membrane of claim 1, wherein the first layer comprising the water dissociation catalyst and the second layer comprising the second water dissociation catalyst together have a total thickness of 0.02 to 1 μm.

9. The bipolar membrane of claim 1, further comprising at least one additional layer comprising a different water dissociation catalyst disposed within the interface junction.

10. The bipolar membrane of claim 1, wherein the first water dissociation catalyst is an inorganic water dissociation catalyst and the second water dissociation catalyst is an inorganic water dissociation catalyst.

11. The bipolar membrane of claim 1, wherein the first water dissociation catalyst and the second water dissociation catalyst are independently selected from a metal, a metal oxide, a metal phosphide, or a metal sulfide.

12. The bipolar membrane of claim 1, wherein the first water dissociation catalyst and the second water dissociation catalyst are independently selected from rutile $TiO_2$, anatase $TiO_2$, $In_2O_3$, indium tin oxide, $Sb:SnO_2$, $Sn_2O_3$, Ir, $IrO_2$, Pt, Ru, $RuO_2$, Pd, Rh, $MnO_2$, NiO, $Al_2O_3$, $SiO_2$, $ZnO_2$, $ZrO_2$, $Co_2O_3$, $Co:Fe_2O_3$, $Fe(OH)_3$, Pt—Ir(1:1), or Pt—Ru(1:1).

13. The bipolar membrane of claim 1, wherein the first water dissociation catalyst contacting a surface of the anion exchange material is selected from NiO, Pd, PtIr or Ir, and the second water dissociation catalyst contacting a surface of the cation exchange material is selected from $Fe(OH)_3$, $RuO_2$, or $IrO_2$.

14. The bipolar membrane of claim 1, wherein the first water dissociation catalyst contacting a surface of the anion exchange material comprises NiO nanoparticles, and the second water dissociation catalyst contacting a surface of the cation exchange material comprises $IrO_2$ nanoparticles.

15. An electrochemical device comprising the bipolar membrane of claim 1.

16. The electrochemical device of claim 15, wherein the bipolar membrane is configured to promote dissociation of water.

17. A bipolar membrane comprising a first member comprising at least one anion exchange material having a first surface; a second member comprising at least one cation exchange material having a second surface, wherein the first member first surface and the second member second surface face each other to form an interface junction; and disposed within the interface junction is a plurality of individual layers, each individual layer comprising a different water dissociation catalyst wherein each individual layer of water dissociation catalyst functions within a predetermined pH range interval within a pH gradient extending between the first material first surface and the second material second surface.

18. The bipolar membrane of claim 17, wherein the pH interval is 1 pH, 2 pH or 3 pH.

19. The bipolar membrane of claim 17, wherein the first member is an anion exchange membrane, and the second member is a cation exchange membrane.

20. The bipolar membrane of claim 19, wherein the different water dissociation catalysts are each in the form of nanoparticles are each independently selected from rutile $TiO_2$, anatase $TiO_2$, $In_2O_3$, indium tin oxide, $Sb:SnO_2$, $Sn_2O_3$, Ir, $IrO_2$, Pt, Ru, $RuO_2$, Pd, Rh, $MnO_2$, NiO, $Al_2O_3$, $SiO_2$, $ZnO_2$, $ZrO_2$, $Co_2O_3$, $Co:Fe_2O_3$, $Fe(OH)_3$, Pt—Ir(1:1), or Pt—Ru(1:1).

* * * * *